United States Patent
Rinde

(10) Patent No.: US 6,182,823 B1
(45) Date of Patent: Feb. 6, 2001

(54) COMPACT DISK PACKAGING WITH WINDOW

(76) Inventor: Paul D. Rinde, 961 C. Longwood Rd., Amery, WI (US) 54001

(*) Notice: Under 35 U.S.C. 154(b), the term of this patent shall be extended for 0 days.

(21) Appl. No.: 09/144,201

(22) Filed: Sep. 1, 1998

(51) Int. Cl.[7] .................................................. B65D 85/57
(52) U.S. Cl. ........................ 206/232; 206/308.1; 206/776
(58) Field of Search ............................... 206/232, 308.1, 206/311, 312, 313, 776, 777, 778, 459.5

(56) References Cited

U.S. PATENT DOCUMENTS

| | | |
|---|---|---|
| D. 362,149 | 9/1995 | Bond et al. ........................... D6/629 |
| 4,850,731 | 7/1989 | Youngs .................................. 402/79 |
| 4,899,875 | 2/1990 | Herr et al. ............................ 206/313 |
| 5,515,967 | 5/1996 | Fitzsimmons et al. ............... 206/307 |
| 5,611,426 * | 3/1997 | Warfield ............................. 206/308.1 |
| 5,662,218 * | 9/1997 | Ladwig .......................... 206/308.1 X |
| 5,669,551 | 9/1997 | Siglock .............................. 229/103.2 |
| 5,690,220 | 11/1997 | Swan ..................................... 206/308 |
| 5,694,743 | 12/1997 | Beighle ................................. 53/445 |
| 5,713,462 | 2/1998 | Hansen ................................. 206/308 |
| 5,791,468 * | 8/1998 | House ............................... 206/308.1 |

\* cited by examiner

Primary Examiner—Jacob K. Ackun

(57) ABSTRACT

A packaging system for a compact disk comprising a box and a insert disposed within the box. The insert including first indicia disposed on the insert. The first indicia are setback from the window and are viewable through the window to provide a three-dimensional image.

10 Claims, 3 Drawing Sheets

COMPACT DISK PACKAGING WITH WINDOW

BACKGROUND OF THE INVENTION

The present invention relates to a packaging system for a compact disk.

Compact disks are a popular medium for selling software. One drawback of compact disks is that compact disks are easily damaged and must be sold in a protective package. There have been numerous types of packages and containers which have been developed to protect compact disks.

The Youngs patents (U.S. Pat. No. 4,850,731) discloses a flexible sleeve which protects a compact disk from scratches and dust. The sleeve is made of a polyester material which is softer than cotton or paper and prevents the optical side of the compact disk from being scratched. The sleeve protects the compact disk while taking up relatively little space.

The Hansen patent (U.S. Pat. No. 5,713,462) discloses a compact disk packaging system including a box with a window and an insert for packaging multiple compact disks. The insert provides a system for packaging multiple compact disks and securing the compact disks within a tent-like structure. The compact disks are viewable through the window within the box when the insert containing the compact disks is placed within the box.

The Fitzsimmons et al. patent (U.S. Pat. No. 5,515,967) discloses a storage packet made of a plastic which contains a compact disk and a 3½ inch diskette. The container for the compact disk and 3½ cassette contains a frame and a window. The compact disk is viewable through the window when the container is closed and fastened.

The Beighle patent (U.S. Pat. No. 5,694,743) discloses a method for storing a compact disk in a sleeve. The sleeve containing the compact disk is fastened within the inside cover of a book. The book containing the compact disk is used to market the product.

The Bond et al. patent (U.S. Pat. No. Des. 362,149) discloses a compact disk packaging system wherein the system includes a box and an insert. Within the box are two windows from which rows of compact disks can be viewed. The compact disks are placed within an insert designed to secure rows of compact disks which prevent the compact disks from being damaged.

The Swan patent (U.S. Pat. No. 5,690,220) discloses a holder or packaging arrangement to store compact disks. The holder disclosed in the Swan patent is made of a transparent, non-woven material from which the compact disk can be seen. The holder is designed to be fastened to a hard cover of a book or binder which will protect the disk from being bent.

The Herr et al. patent (U.S. Pat. No. 4,899,875) discloses a compact disk packaging system comprising an insertable drawer which is slidably contained within an outer housing. The outer housing contains a window such that the compact disk is viewable through the outer housing.

BRIEF SUMMARY OF THE INVENTION

The present invention includes a package for a compact disk that has a box and an insert which fits within the box. The box includes a window which cooperates with first indicia within the box, the first indicia being set back from the window of the box to create a three-dimensional image in the consumer's eye. Preferably, the window also has second indicia that cooperate with the first indicia to create the three-dimensional image

DETAILED DESCRIPTION OF THE PREFERRED EMBODIMENTS

Figure 1:
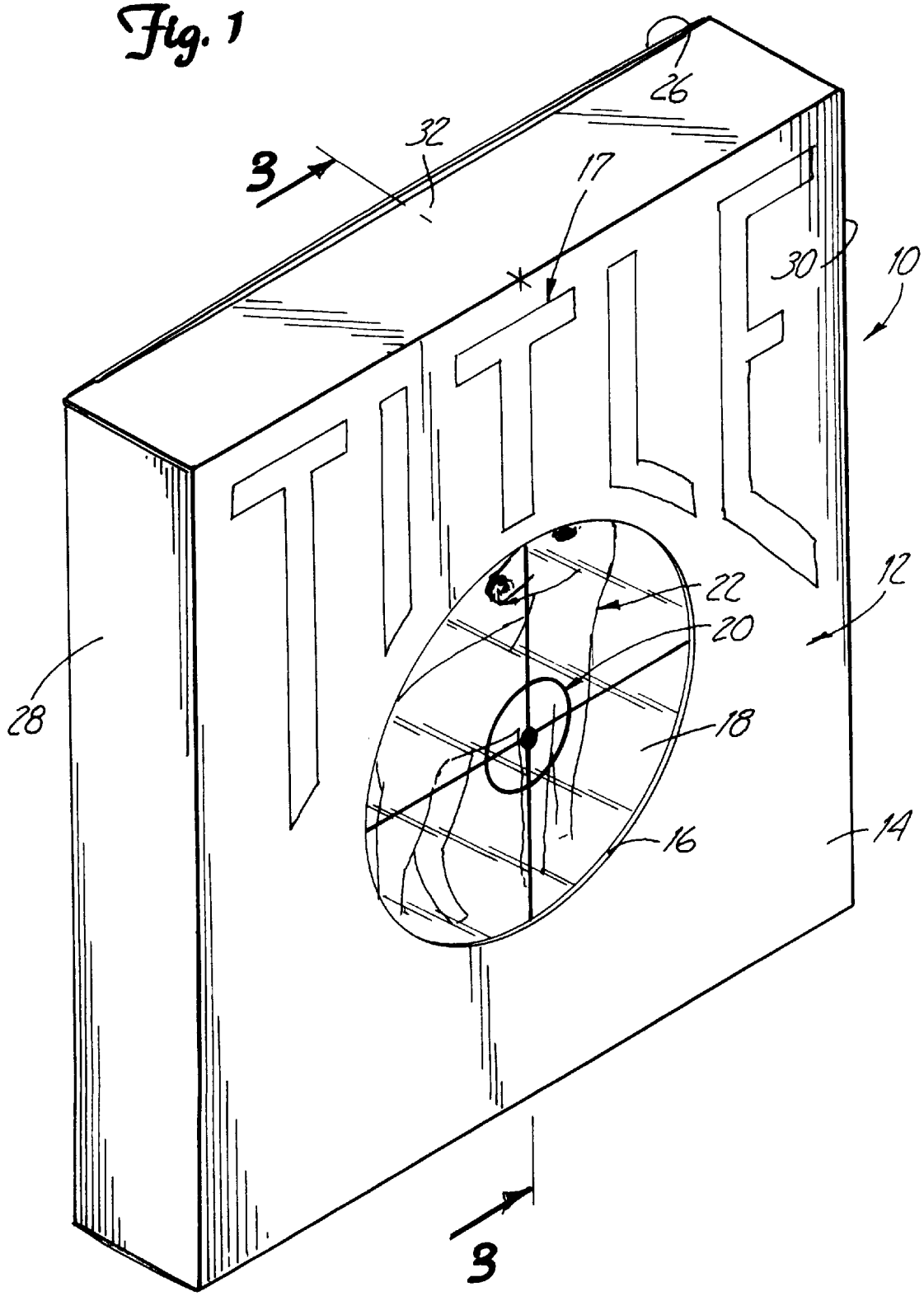
FIG. 1 is a perspective view of a packaging system for a compact disk containing a box with a window from which a three-dimensional image is viewed.
Figure 2:
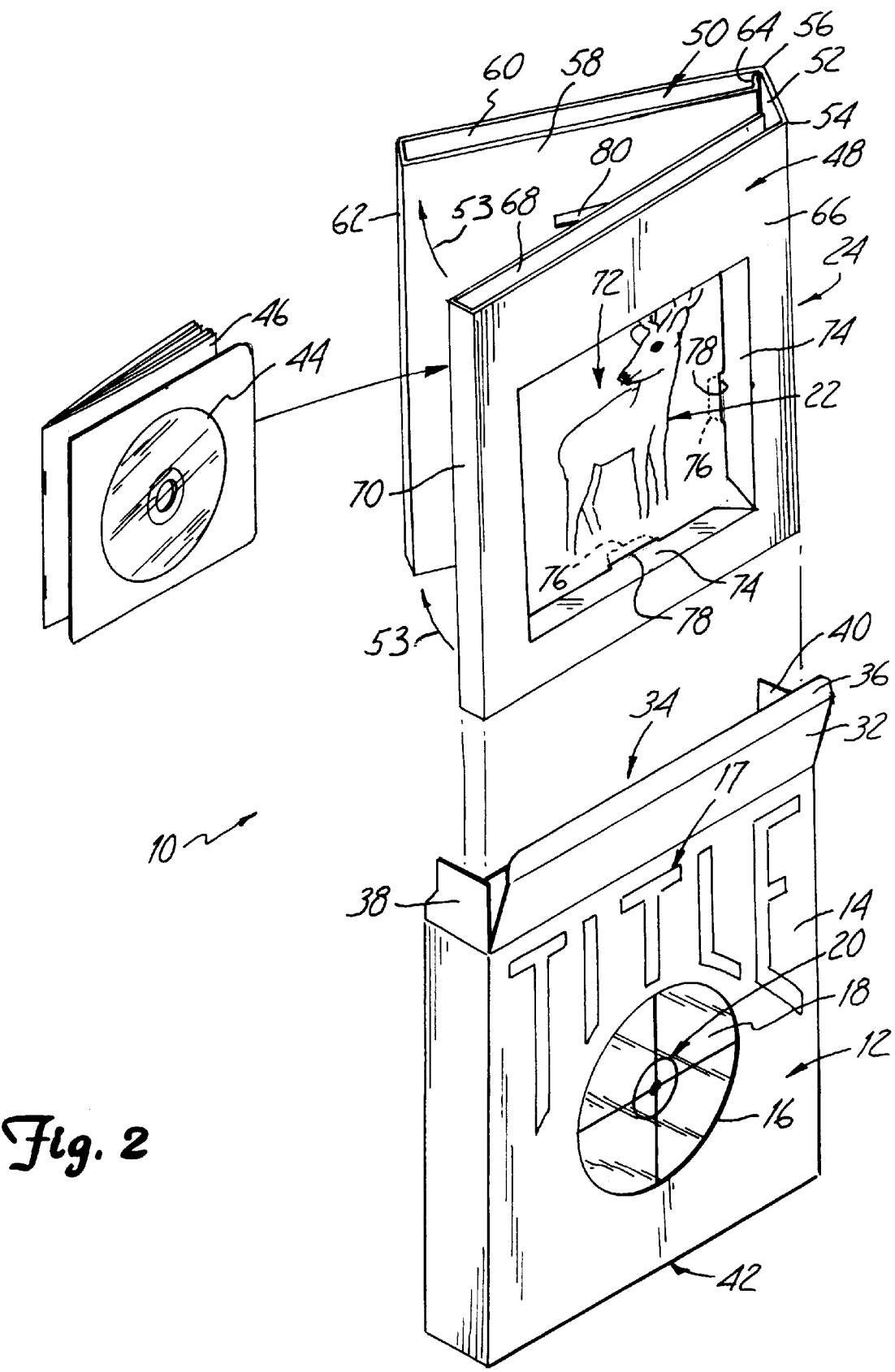
FIG. 2 is an exploded perspective view of the present invention.

Packaging of computer programs is critical to the commercial success of a product. A packaging system of the present invention is generally illustrated in FIGS. 1 and 2. The packaging system 10 includes a box 12 and an insert 24, both preferably made of cardboard or paperboard.

The box 12 includes a front panel 14. The front panel 14 includes an opening 16 which is covered with a transparent, optically clear, or translucent sheet 18 of polymeric material to form a window 19. Preferably, panel indicia 17 such as a title or name of the product within the packaging system 10 are positioned on the front panel 14. Window indicia 20 are preferably disposed on the transparent, optically clear, or translucent sheet 18. Interior indicia 22 are setback from the window 19 to provide a three-dimensional effect, as best illustrated in FIG. 1. Additionally, the interior indicia 22 are set back from the window indicia 20 and a single viewable three-dimensional image is provided through cooperation between the indicia 20 and 22. Although a specific graphical view is depicted in the Figures (a hunting sight as the window indicia 20 and a deer as the interior indicia 22) the indicia may take many forms and can be a combination of images, pictorial representations, lettering, graphical views and any other form that may be useful in promoting the software on the compact disk. By three-dimensional is meant giving the illusion of depth to the viewer.

The box 12 further includes a back panel 26, left and right side panels 28 and 30 which connect the back panel 26 with the front panel 14. The box 12 further includes top tab member 32 which extends respectively from left and right side panels 28 and 30 and extends over opening 34 when the box 12 is closed. A tuck flap 36 attached to the top tab member 32 secures the top tab member in a closed position when covering the opening 34. The top tab member 32 overlies left and right dust flaps 38 and 40 when in the closed position. A bottom end 42 (not shown) of the box 12 includes a closure construction similar to the top tab member 32, tuck flap 36 and left and right dust flaps 38 and 40.

As best illustrated in FIG. 2, the insert 24 has a dual purpose. The insert 24 includes the interior indicia 22 disposed thereon, and is used to retain a compact disk 44 and accompanying documentation 46 in a captive manner.

The insert 24 includes a forward multi-panel structure 48 and a rearward multi-panel structure 50 connected to each other by a side insert panel 52. The forward and rearward structures 48 and 50 are permitted to move with respect to each other as indicated by arrows 53 along creases 54 and 56 which run the length of the side panel 52 adjacent to the front structures 48 and 50, respectively. Preferably, the entire construction of the insert 24 is made from a single sheet of hardboard or cardboard that is folded along a plurality of crease lines to form the structure described herein.

The rearward structure 50 includes front rearward structure panel 58 and back rearward structure panel 60 joined by side rearward structure panel 62. A side spacer panel 64 is positioned opposite from side panel 62 and provides structural integrity and cooperates with panel 62 to space the panels 58 and 60 from each other.

Similarly, the forward structure 48 includes a front forward structure panel 66 and a back forward structure panel 68 joined by a side forward structure panel 70. The front forward structure panel 66 also includes an opening 72 defined by four framing flaps 74 that extend toward the back forward structure panel 68. Each of the framing flaps 74 includes a tab member 76 that extends through a slot 78 disposed in the back forward structure panel 68. The framing flaps 74 are held in a framing position surrounding the indicia 22 through engagement of the slots 78 by the tab members 76.

Preferably, the indicia 22 are directly imprinted on the back forward panel 68. However, the indicia 22 may be disposed on a separate sheet that is adhesively secured to the back forward panel 68. The framing flaps 74 also serve to space the front forward panel member 66 from the rear forward panel member 68 in cooperation with the side panel 70 and to provide structural integrity to the structure 48.

Figure 3:
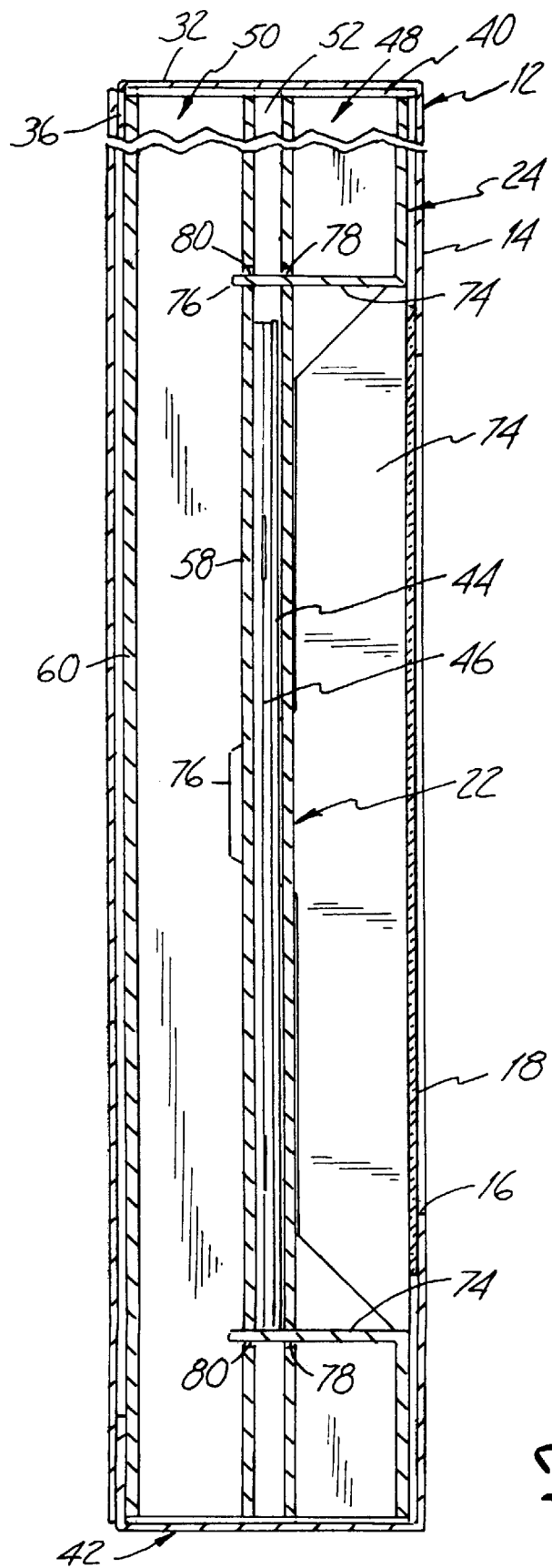
FIG. 3 is a cross sectional view taken along line 3—3 in FIG. 1.

The front rearward panel 58 includes four slots 80 that are aligned with slots 78 in the forward back panel 68, as best illustrated in FIG. 3. The tab members 76 are sufficient in length to extend through slots 78 and into the slots 80 and define an area between the structures 48 and 50 in which the compact disk 44 and accompanying documentation 46 are retained in a captive position between the four tab members 76 when the insert 24 is disposed within the box 12. It will be appreciated that the dimensions of the insert 24 are such that the insert 24 engages interior surfaces of the box 12 in a snug fit and that the compact disk and documentation are held in a flat and secure manner between the structures 48 and 50 in the area defined by the tab members 76.

Although the present invention has been described with reference to preferred embodiments, workers skilled in the art will recognize that changes may be made in form and detail without departing from the spirit and scope of the invention.

What is claimed is:

1. An apparatus comprising:
   a package having a front panel and including a window inn the front panel;
   first indicia disposed on the window;
   an insert within the package;
   second indicia disposed on the insert, the second indicia being spaced from the window, and the first indicia overlying the second indicia to produce a three-dimensional image; and
   a compact disk secured by the insert within the package.

2. The apparatus of claim 1 wherein the insert includes a forward multi-panel structure and a rearward multi-panel structure and wherein the compact disk is secured between the front multi-panel structure and the rearward multi-panel structure.

3. The apparatus of claim 2 wherein the second indicia are disposed on the forward multi-panel structure.

4. The apparatus of claim 3 wherein the forward multi-panel structure includes a front forward panel and a rear forward panel spaced from the front forward panel and wherein the front forward panel includes an opening and the second indicia being disposed on the rear forward panel.

5. The apparatus of claim 4 and further including a plurality of framing flaps extending from the front forward panel to the rear forward panel and providing a frame about the second indicia.

6. The apparatus of claim 5 wherein the framing flaps each include tab members and wherein the rear forward panel includes a plurality of slots disposed to receive the tab members to retain the framing flaps in a framing position.

7. The apparatus of claim 2 wherein the compact disk is disposed between the forward multi-panel structure and the rearward multi-panel structure.

8. The apparatus of claim 6 wherein the compact disk is disposed between the front rearward panel and the rear forward panel in an area defined by the tab members.

9. An apparatus comprising:
   a package;
   an insert including a forward multi-panel structure and a rear multi-panel structure jointed together by a joining panel;
   a compact disk disposed between the front multi-panel structure and the rear multi-panel structure;
   tab members extending between the front multi-panel structure and the rear multi-panel structure, the tab members defining an area in which the compact disk is retained.

10. The apparatus of claim 9 wherein the forward multi-panel structure includes a front forward panel and a rear forward panel spaced from the front forward panel and wherein the front forward panel includes flap members extending therefrom toward the rear forward panel, and wherein the tab members extend from the flap members and extend through a plurality of first respective slots disposed within the rear forward panel member into a plurality of second slots within the rear multi-panel structure.

* * * * *

UNITED STATES PATENT AND TRADEMARK OFFICE
CERTIFICATE OF CORRECTION

PATENT NO. : 6,182,823 B1
DATED : February 6, 2001
INVENTOR(S) : Paul D. Rinde

It is certified that error appears in the above-identified patent and that said Letters Patent is hereby corrected as shown below:

<u>Title page,</u>
After Item [76], Inventor, insert -- [73] Assignee: WizardWorks Group, Inc., Minneapolis, Minnesota --.

Signed and Sealed this

Twelfth Day of February, 2002

*Attest:*

*Attesting Officer*

JAMES E. ROGAN
*Director of the United States Patent and Trademark Office*